US012673832B2

(12) United States Patent
Wikström

(10) Patent No.: US 12,673,832 B2
(45) Date of Patent: Jul. 7, 2026

(54) AUTOMATIC WOOD SORTING FACILITY

(71) Applicant: RENHOLMEN AB, Byske (SE)

(72) Inventor: Urban Wikström, Piteå (SE)

(73) Assignee: RENHOLMEN AB, Byske (SE)

( * ) Notice: Subject to any disclaimer, the term of this patent is extended or adjusted under 35 U.S.C. 154(b) by 134 days.

(21) Appl. No.: 18/701,839

(22) PCT Filed: Sep. 30, 2022

(86) PCT No.: PCT/SE2022/050871
§ 371 (c)(1),
(2) Date: Apr. 16, 2024

(87) PCT Pub. No.: WO2023/068979
PCT Pub. Date: Apr. 27, 2023

(65) Prior Publication Data
US 2024/0425295 A1 Dec. 26, 2024

(30) Foreign Application Priority Data
Oct. 20, 2021 (SE) .................................... 2151276-9

(51) Int. Cl.
B65G 43/08 (2006.01)
B25J 15/00 (2006.01)
(Continued)

(52) U.S. Cl.
CPC .............. B65G 43/08 (2013.01); B25J 15/04 (2013.01); B65G 47/90 (2013.01);
(Continued)

(58) Field of Classification Search
CPC ............ B65G 43/08; B65G 2201/0282; B65G 47/90; B07C 2501/0063; B07C 5/14;
(Continued)

(56) References Cited

U.S. PATENT DOCUMENTS 5,544,757 A 8/1996 Geiger et al.

FOREIGN PATENT DOCUMENTS

AU 2006249164 A1 11/2006
CA 2335784 A1 8/2001
(Continued)

OTHER PUBLICATIONS

International Search Report and Written Opinion for Application No. PCT/SE2022/050871, dated Jan. 27, 2023, 14 pages.
(Continued)

*Primary Examiner* — James R Bidwell

(74) *Attorney, Agent, or Firm* — McCarter & English, LLP

(57) ABSTRACT

The invention relates to an automatic wood sorting facility comprising a cross conveyor (3) with a conveying plane (Z0) on which sawn pieces of wood (2) are advanced, an inspection zone (5) comprising a camera (70), a camera-carrying arrangement (6) by which the camera (70) is arranged in such a manner that the pieces of wood (2) advanced on the cross conveyor (3) can be inspected by means of the camera, a robot gripper zone (8) comprising a robot (RB1) equipped with a robot gripper tool (11) by which a piece of wood (2) can be gripped and handled, a robot-carrying arrangement (9) by which the robot (RB1) is arranged in such a manner that said conveying plane (Z0) extends below the working area of the robot (RB1) with the robot gripper tool (11), a robot control unit (40) to which the camera (70) is connected, and which robot control unit further comprises a vision system (30) by which the piece of wood (2) can be identified, an image processing unit (50) and a robot control (60) configured to form a tracking system with a defined tracking area (TR1) of the length of the conveying plane (Z0), wherein the robot (RB1) is configured, with instruction from the vision system (30), to grip and handle an identified piece of wood (2) within the tracking area (TR1).

10 Claims, 3 Drawing Sheets

(51) Int. Cl.
  *B25J 15/02* (2006.01)
  *B25J 15/04* (2006.01)
  *B65G 47/90* (2006.01)

(52) U.S. Cl.
  CPC ........ *B25J 15/0071* (2013.01); *B25J 15/0253* (2013.01); *B65G 2201/0282* (2013.01); *B65G 2203/041* (2013.01)

(58) Field of Classification Search
  CPC .... B07C 5/34; B25J 9/16; B25J 15/04; G01N 21/898; G01N 33/46
  See application file for complete search history.

(56) References Cited

FOREIGN PATENT DOCUMENTS

| | | | |
|---|---|---|---|
| CN | 207397297 U | 5/2018 | |
| CN | 111843981 A | 10/2020 | |
| CN | 112871686 A | 6/2021 | |
| CN | 112871698 A | 6/2021 | |
| DE | 102017005170 A1 | 11/2017 | |
| JP | 11-268804 A | 10/1999 | |
| SE | 508013 C2 | 8/1998 | |
| WO | WO-2012164126 A1 * | 12/2012 | ............ B65G 15/14 |
| WO | 2019/114380 A1 | 6/2019 | |
| WO | WO-2020079125 A1 * | 4/2020 | .......... B07C 5/3422 |

OTHER PUBLICATIONS

Invitation to Pay Additional Fees for Application No. PCT/SE2022/050871, dated Dec. 20, 2022, 6 pages.

International Preliminary Report on Patentability for Application No. PCT/SE2022/050871, dated May 2, 2024, 10 pages.

Swedish Office Action for Applicatio No. 2151276-9, dated Jan. 20, 2021, 3 pages.

Extended European Search Report for Application No. 22884156.5, dated Jul. 14, 2025, 6 pages.

* cited by examiner

Robot gripper zone          Inspection zone

AUTOMATIC WOOD SORTING FACILITY

RELATED APPLICATIONS

This application is a 35 U.S.C. § 371 national stage filing of International Application No. PCT/SE2022/050871, filed on Sep. 30, 2022, which in turn claims the benefit of Swedish Patent Application No. 2151276-9, filed on Oct. 20, 2021. The entire contents of each of the foregoing applications are incorporated herein by reference.

The invention also relates to a robot gripper tool for a robot of an automatic timber sorting facility according to claim 8.

BACKGROUND

After timber is disintegrated into wood in the form of planks and boards, sorting of the wood is carried out, both as raw and (dried) dry wood in continuously working raw sorting facilities and/or adjusting facilities. Sorting of wood is carried out in with respect to quality and/or flaws as well as in connection with adjusted cutting of the wood into specific lengths. A common feature for said sorting facilities is that the wood is advanced in its cross direction on a cross conveyor along a feed line. During sorting, each piece of wood is inspected, and defective pieces of wood are identified that must be handled by being removed or pieces of wood are identified, which must be handled while they lay on each other in the layer or in any other way are deemed likely to cause problems at subsequent downstream operations. Today, the sorting work is usually performed manually by one or a plurality of operators (so-called sorters), who are located at a plurality of assessment points along the feed line. If necessary, an operator can stop the line and by means of a foot pedal fold up a so-called tailgate, which is pivotable about a shaft from a substantially horizontal state, whereby an observed defective piece of wood can be guided down to a level blow the conveying plane of the cross conveyor. A defective piece of wood can have structural damage or changes in shape such as cambers or edge bends. Defects can also comprise fungus or rot damage of the wood.

However, in modern sorting facilities both the cross conveyor and the various machines along the sorting facility line work at speeds and production rates that often exceed the operator's capacity. But the time required for assessing the quality of a piece of wood cannot be reduced without reducing the quality of the work. Poorly executed sorting is unacceptable, though, as it will at any rate directly or indirectly involve financial losses, because the wood will not retain the intended sorting quality, which in the long run leads to future sales problems for the affected sawing industry. To obtain the desired production rates, existing sorting facilities have to be operated by several persons, which is not only costly, but also implies a need for shift work to avoid a low capacity utilization of such facilities. As the manual sorting work to a certain extent is based on the individual operator's subjective assessment, it should be understood that the assessed sorting quality can vary in an undesirable way.

Therefore, there is a wish to increase the production capacity of sorting facilities without sacrificing the sorting quality.

SUMMARY OF THE INVENTION

A first object of the present invention is thus to obtain an automatic wood sorting facility that, with optimum high capacity, enables utilization of a system without impairing the sorting result. A second object of the invention is to achieve a gripper tool that is intended to be used by a robot in an automatic wood sorting facility according to the invention.

This first object of the invention is resolved by and automatic sorting facility having the features and characteristics stated in claim 1. The second object of the invention is resolved by a robot gripper tool having the features and characteristics stated in claim 8.

In an embodiment of the invention, a robot with a robot gripper tool that can grip and handle a piece of wood is arranged such that the robot's working area with the gripping tool is disposed at a level above a conveying plane of a cross conveyor for pieces of wood in a sorting facility.

In another embodiment of the invention, a robot control unit with at least one camera, a vision system with which inspected pieces of wood can be identified, an image processing system and a robot control are used configured to form a tracking system with a defined tracking area of the length of the conveying plane, wherein the robot is configured, with data from the vision system, to grip and handle an identified piece of wood within the tracking area.

In another embodiment, the invention comprises a removal arrangement provided for the robot and configured to receive a piece of wood handled by the robot and taken away from the conveying plane.

DESCRIPTION OF FIGURES

In the following, the invention is described in detail with reference to the accompanying drawings, in which.

DESCRIPTION OF EMBODIMENTS

Figure 1:
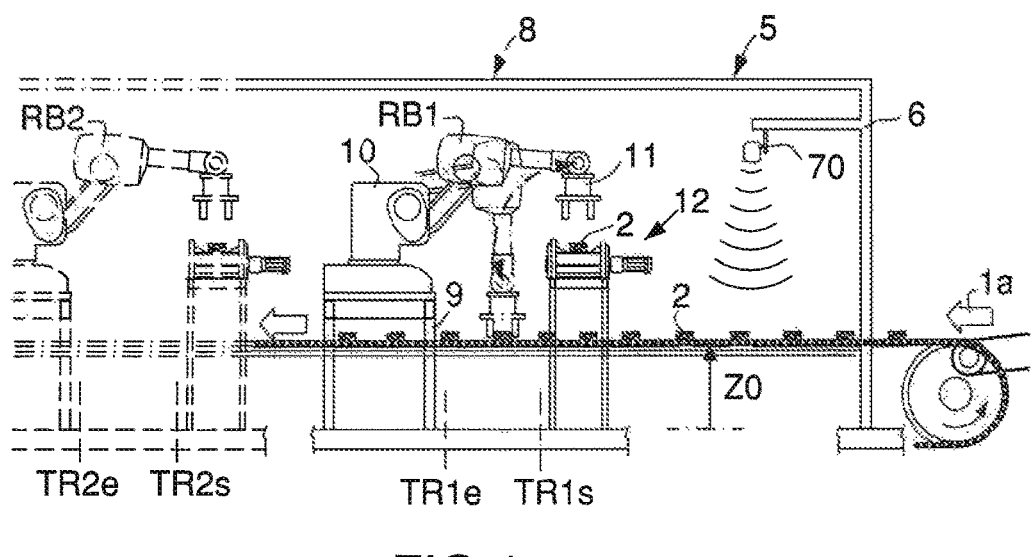
FIG. 1 shows a side view of an automatic wood sorting facility according to the invention, FIG. 2 schematically shows a view from above of an automatic sorting facility according to the invention.

At an automatic wood sorting facility 1 according to the invention, as illustrated by a horizontal arrow 1a, sawn pieces of wood 2, which are to be inspected and handled, arrive one by one on a driver-equipped cross conveyor 3, which according to prior art comprises a plurality of endless conveyor chains 4 travelling in parallel. The cross conveyor 3 has a defined conveying plane Z0 at a level at which the sawn pieces of wood 2 are advanced in their cross direction along a sorting facility line. The term cross conveyor means that elongated pieces of wood are conveyed in their cross direction.

The automatic wood sorting facility 1 comprises an inspection zone 5 with a vision system 30 borne by a camera-carrying arrangement 6 with a camera 70, which in the embodiment described here is arranged at a level above the conveying plane Z0 to enable inspection and identification of pieces of wood 2 that are advanced on the cross conveyor 3, a robot gripper zone 8 with a robot RB1 (industrial robot) mounted on a robot-carrying arrangement 9, which robot is also arranged at a level above the conveying plane Z0, and which robot carries a robot gripper tool 11, which, within a working area, can be switched into and out of retaining engagement with a piece of wood 2 on the cross conveyor 3. Both the camera-carrying arrangement 6 and the robot-carrying arrangement 9 comprises a frame.

The robot RB1 is thus, from a level above the conveying plane Z0, configured to interact with a target object identified by the vision system 30 in the form of a piece of wood 2 by handling the piece of wood, for example by gripping and taking away the piece of wood from the conveying plane Z0 by lifting the piece of wood 2 from the conveying plane Z0.

The automatic wood sorting facility 1 further comprises a removal arrangement generally denoted 12, which can be located at a level above the conveying plane Z0 and extending across that and the cross conveyor 3, and on which removal arrangement 12 the robot RB1 can remove a piece of wood 2 taken away from the conveying plane Z0 of the cross conveyor 3. It should be understood that the removal arrangement alternatively could comprise a type of tailgate that is usually included in an existing cross conveyor, and with which a piece of wood 2 handled by the robot and laid on the tailgate can be guided down to a level below the conveying plane Z0 of the cross conveyor (not shown in the figures).

Figure 2:
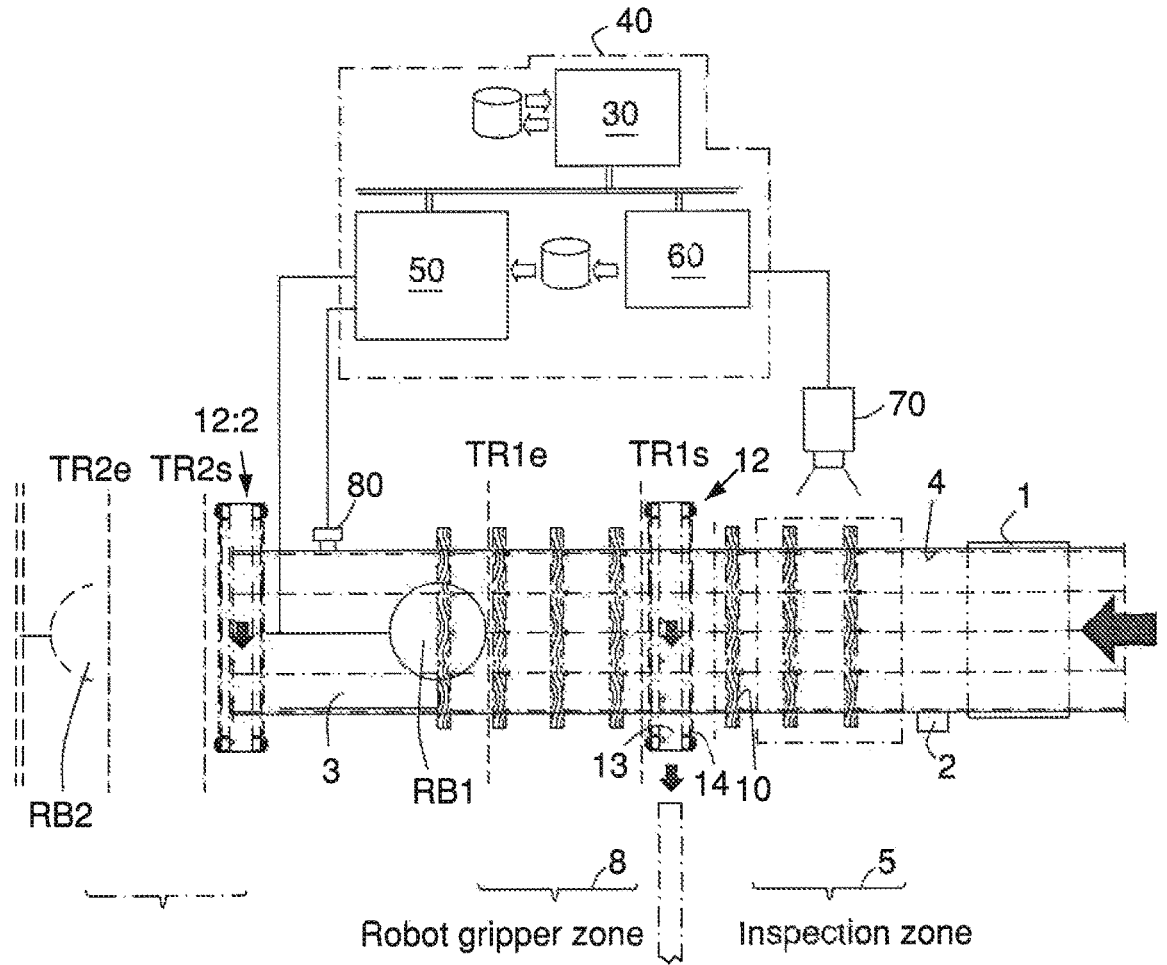

The removal arrangement 12 comprises an endlessly travelling conveyor 13, which is disposed transversely in respect of the travelling direction of the cross conveyor 3, and which by means of an band travelling endlessly over rollers 14 or similarly acting conveying element can remove a piece of wood 2 taken away by conveying the piece of wood in its longitudinal direction laterally out and away from the cross conveyor 3 as illustrated with arrows in FIG. 2.

Figures 3A, 3B:
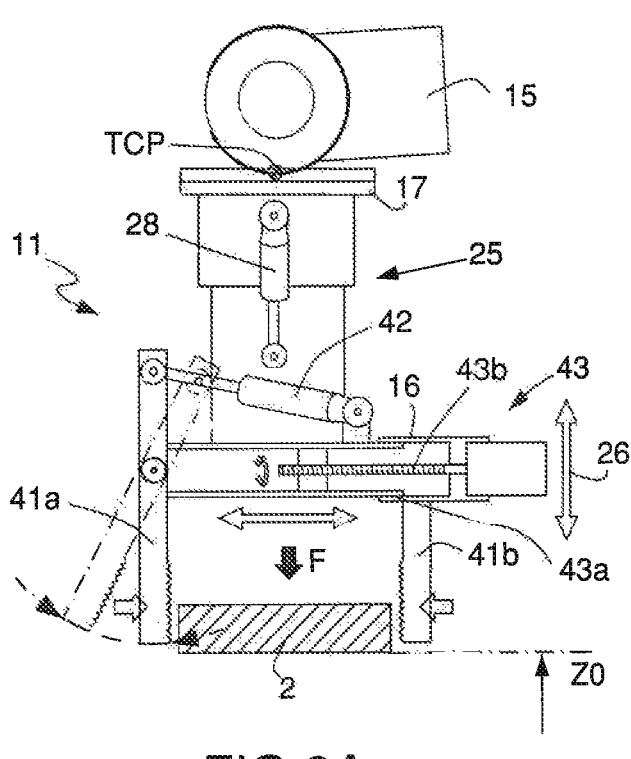
FIGS. 3A and 3B show a side view respectively a view from the front of a gripper tool intended to be used at an automatic wood sorting facility according to the invention.

FIGS. 3A and 3B further show the robot gripper tool 11 according to the invention, intended to be carried by the robot in its tool-carrying arm end 15 with defined zero point reference or tool center point TCP (TCP—Tool Center Point). The robot gripper tool 11 comprises an elongated frame 16, which in a central part is equipped with an attachment 17 for releasable assembly in a corresponding attachment in the robot's tool center TCP, a first gripper generally denoted 21 and a second gripper generally denoted 22, which are arranged in a row next to each other on the elongated frame 16 and are located on either side of the centre of the frame.

The robot gripper tool 11 comprises a first displacement means 25, by which the elongated frame 16 of the gripper tool overall and thereby also the first and second grippers 21, 22 jointly can be displaced in a direction of motion to respectively from the robot's RB1 tool center TCP, which is illustrated with the double arrow 26. In the embodiment described here, said first displacement means 25 comprises hold and control devices in the form of a frame rack 27 with two, via a guide or linear control, displaceable frame parts, the extended length of which can be varied by impact of an actuator and activator 28 provided for the frame parts, which can be, but not necessarily is, pneumatically driven.

The robot gripper tool 11 further comprises a second displacement means 30, by which the first gripper 21, independently of the first displacement means 25, can be displaced in a direction of motion to respectively from the robot's RB1 tool center TCP, which is illustrated with the double arrow 31 in FIG. 3B. Each of said first and second displacement means 25, 30 are configured to work independently of each other and is driven by a predetermined restricted driving force F against the piece of wood 2 to be gripped and handled.

In the embodiment described here, said second displacement means 30 comprises a linear control 32 or guide consisting of a pair of profile rails arranged in parallel along which a frame piece 33 is displaceable in a direction to respectively from the robot's RB1 tool center TCP through impact of an actuator and activator 34 that can be, but not need necessarily is, pneumatically driven. At its lower end, the frame piece 33 carries a platform-like support portion 35, which is intended to be connected to and through impact by said actuator and activator 34 be brought to application against a piece of wood 2 resting on the conveying plane Z0 of the cross conveyor.

The frame piece 33 further carries a first respectively second drill unit 36, which on sledges, illustrated with the double arrow 34, are jointly displaceable forwards and backwards on the frame piece 33 and thereby in the direction to respectively from the robot's tool center TCP through impact of a linear actuator 37, comprising a motor-driven ball screw unit. Each drill unit 36 has a chuck, in which a rotatable screw tool 38 can be accommodated. Through impact of the linear actuator 37, a length feed movement can be applied to both drill units 36 at a predetermined feed speed in the direction to respectively from the robot's RB1 tool center TCP. The platform-like support portion 35 is provided with a hole 37, through which said screw tool 38 (type of French wood screw or similar screw equipped with drill tip and having rough threading) fastened in said respective chuck and interacting with wood can pass to get attached to a piece of wood 2 by, during rotation, screwing into same. It should be understood that at an accommodated piece of wood 2, the platform-like support portion 35 will function as abutment of said screws 38.

The second gripper 22 of the robot gripper tool 14 comprises a parallel gripper with two mutually moveable fingers 41a, 41b, which can open and close to grip around a piece of wood 2 in a closed state, which is illustrated in the figures. In the embodiment described here, the first finger 41a is pivotably suspended in the frame 16 about a shaft and variable through impact of an actuator and activator 42 in the form of a pneumatically effective gripping cylinder by means of the second finger is configured as a fixed gripping plate 41b to serve as abutment for the first finger. To be able to grip around the edges of the pieces of wood of varying dimensions, the effective width between the first finger 41a and the abutment 41b (the second finger) is variable by means of a linear unit 43, acting between the first finger and the gripping plate, in which unit a guide 43a and a motor-driven ball screw unit 43b is included.

Figure 4:
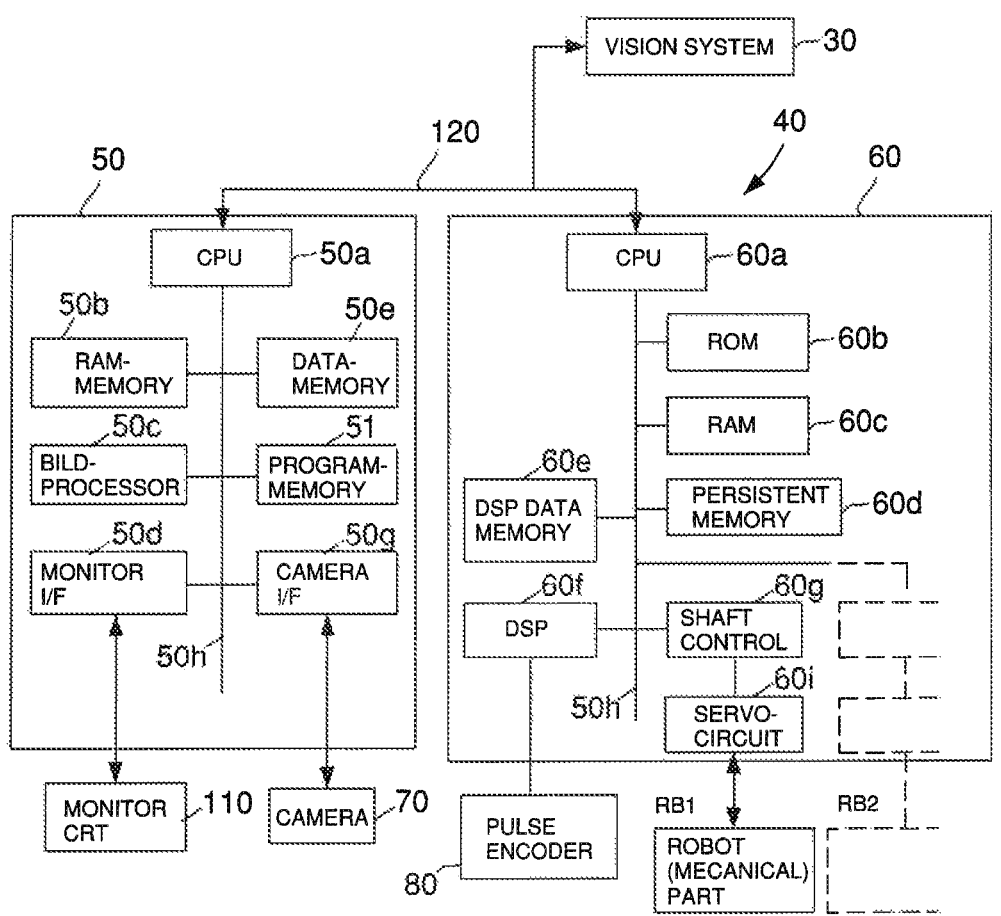
FIG. 4 shows a block diagram of a control unit included in a robot system, allowing control of one or a plurality of robots in combination with a vision system for inspection of pieces of wood and a tracking system for tracking pieces of wood that are conveyed forwards on a cross conveyor.

Also with reference to FIG. 2 and FIG. 4, the invention comprises a robot control unit 40 with a tracking system, with which said robot RB is arranged to carry out a tracking operation. In the following, the term "tracking operation" means tracking (localizing) and handling an identified piece of wood 2, which is conveyed on the cross conveyor 3, and at the same time, the tracked piece of wood constitutes an object to which an operation is to be applied, which can include handling, while it is conveyed on the cross conveyor 3. The tracking technique for objects conveyed on a conveyor in combination with one or a plurality of robots is for example known from US 2005/0075752 A1.

Moreover, each camera 70 (or the plurality of cameras) included in the vision system 30 is configured to be used jointly with an image processing unit 50 and robot control 60 included in the robot control unit 40, forming part of a detection means for detecting the position of the piece of wood 2 on the conveying plane Z0 during the tracking operation. In addition to said camera 70, the visual sensor system has an image processing unit 50 connected thereto, which can generate an image via the camera 70 to in this manner detect the state or position of a piece of wood 2 on the cross conveyor 3. As illustrated with the arrow 1*a*, an input device, not shown in detail, continuously supplies the pieces of wood 2 for further conveyance on the cross conveyor 3, which pieces of wood thereby constitute the object of the operation.

At some point, the pieces of wood 2 can have random positions on the cross conveyor 3. A drive shaft on the cross conveyor 3 is powered by a motor of a power source 3*a*, which motor can advantageously be of the type, which is possible to speed control in order to regulate the speed of the cross conveyor 3. The advantages of a speed-controllable motor is described in more detail in the following.

A pulse encoder 80 for detecting an amount of rotation of the drive shaft for the power source 3*a* is arranged as a means for detecting the amount of motion of the cross conveyor 3, so that the amount of motion of the cross conveyor 3 can be detected by calculating the number of pulses in a pulse train coming from the pulse encoder 80. In this embodiment, a combination of the visual sensor system 30 and the tracking system 40, 50 is used for partly inspecting the pieces of wood 2 on the cross conveyor 3 and partly detecting the state of each identified piece of wood 2 on the cross conveyor 3, which is thereby to be handled via the robot control unit 40 with the connected image processing unit 50 included in the tracking system.

The robot control unit 40 has a robot control 60 to control the robot and carry out a tracking operation, by collecting data representing a position of each identified piece of wood 2 from the image processing unit 50 and by using the amount of motion from the pulse encoder 80 as a signal, for controlling the robot's RB tracking operation.

In FIG. 2, reference designation TR indicates a tracking area for the robot RB, within which area the robot can grip and handle a piece of wood 2. The reference designation TRs denotes an upstream zone line for the tracking area TR, and the reference designation TRe a downstream zone line thereof. It has turned out to be suitable to use a vision system that, by means of the pulse encoder and monitoring of amount of motion, enables "tracking" each piece of wood (object) that is conveyed forwards on the cross conveyor 3. The technique of photographing and tracking to determine the position of an object during forward motion on a conveyor has been known for long and will therefore not be described in more detail. Said technique of tracking an object makes it possible to localize a piece of wood and its position on the cross conveyor at any moment to enable the robot RB1 to efficiently grip and handle an inspected and identified piece of wood 2. In an embodiment of the present invention, it is imaginable that the robot RB1 can grip and handle a piece of wood 2 identified by the vision system 30 of a stopped cross conveyor 3 (line), and wherein the piece of wood momentarily is stagnant. In another embodiment, it is imaginable that the robot RB1 is synchronized to carry out a working movement synchronously with the speed of the cross conveyor 3 in the feed direction to thereby be able to grip and handle an identified piece of wood "on the fly", i.e. while the identified piece of wood 2 is conveyed forwards on the cross conveyor 3.

Furthermore, the known tracking technique enables distributing the work of handling each identified piece of wood 2 between a plurality of robots RB1-RB1+n mutually spaced apart along the cross conveyor 3, wherein each robot has a specifically defined tracking area TR1-TR1+n and determining which of the successively downstream situated robots that can suitably handle a piece of wood 2 identified by the vision system 30.

As shown in FIG. 4, the image processing unit 50 of the tracking system has a CPU 50*a*, consisting of a microprocessor connected to a RAM memory 50*b*, an image processor 50*c*, a monitor interface 50*d*, a data memory 50*e*, a program memory 50*f* and a camera interface 50*g* connected to each other via a bus 50*h*. The camera interface 50*g* is connected to said camera 70, and an image taken by the camera 70 is stored in the image memory 50*b*. Data stored in the RAM memory 50*b* is analysed by means of the image processor 50*c* to thereby determining the position of the identified piece of wood 2. The data memory 50*e* has an area, in which various setting data for the visual sensor system can be stored, and in which measuring position data for the piece of wood 2 is stored. An analysis program is stored in the program memory 50*f*.

Said CPU 50*a* is connected via a bus 120 in the robot control unit 40 with a CPU 60*a* with the robot control 60 as well as with the vision system 30 to inspect and identify the pieces of wood 2. Correspondingly, the CPU 60*a* of the robot control 60 is connected to the CPU 50*a* of the image processing unit 50 via the bus 120. The CPU 60*a* is connected via a bus 60*k* with a ROM 60*b*, a RAM 60*c*, a non-transitory (persistent) memory 60*d*, a digital signal processor (DSP) 60*f* and a DSP data memory 60*e*. A program stored in ROM 60*b* controls the entire system and on RAM 60*c*, data can be temporarily stored for subsequent processing in the CPU. In the non-transitory memory 60*d*, an operating program, setting data and a distribution processing program are stored for the robot RB1.

DSP 60*f* is a processor for processing of the output signals from the pulse encoder 80, and the DSP data memory 60*e* has stored data processed by DSP 60*f* and setting parameters. DSP 60*f* is configured to calculate an output signal from the pulse encoder 80 at any time according to an instruction from the CPU and thereby detect a displacement motion of the cross conveyor 3 and write the detected displacement motion in a predetermined area of the DSP data memory 60*e*. The DSP data memory 60*e* can also be reached from CPU 50*a* in the image processing unit 50 via CPU 60*a* in the robot control unit 40. Furthermore, in the robot control unit 40 a shaft control unit 60*g* is connected to the bus 60*k* to control the robot RB1. A mechanical part of the robot RB1 is connected to the shaft control unit 60*g* through a servo amplifier 60*i*. The robot control unit 40 is also connected via an input/output circuit with a motor drive unit (not shown) to operate the motor in the power source 2 of the cross conveyor 3.

This type of technique enables, via the robot RB1, tracking and handling an object or an identified piece of wood 2 "on the fly", i.e. while the piece of wood is displaced forwards along the cross conveyor 3 conveying plane.

Another advantage of the vision system described above at tracking and localizing each object of an automatic wood sorting facility 1 according to the invention is that it becomes possible to increase the sorting capacity of the facility by adding a second robot RB2 or a plurality of "n" number of additional RB1+n robots downstream of the cross conveyor 3, which thereby can carry out an operation on a target object (an identified piece of wood), which without action has passed the tracking area (TR1*s*-TR1*e*) for a first robot RB1 located upstream, but wherein it should be possible to handle the target object within a subsequent downstream tracking area (TR2s-TR2e) for a subsequent robot RB2 as illustrated in FIG. 2. The block diagram in FIG. 4 also illustrates this option of adding another robot RB2 to the vision system with tracking by means of a pulse encoder and monitoring of amount of motion for each piece of wood (object) conveyed forwards on the cross conveyor. In this case, each additional robot RB2-RB2+n is connected to a removal arrangement 12:1-12:1-*n*.

Yet another advantage of using a vision system 30 in combination with a tracking system 40 that allows tracking and localizing each object at an automatic wood sorting facility 1 for tracking and localizing pieces of wood 2 according to the invention is that it enables adapting or synchronizing the speed of the cross conveyor to the available capacity of the robot or robots RB1, RB2 etc. included in the automatic wood sorting facility for tracking and localizing each piece of wood 2. As an example, it can be suitable to temporarily reduce the speed of the cross conveyor 3 if a plurality of identified, for example in the form of non-approved pieces of wood 2 would appear in a group or immediate succession on the cross conveyor 3.

The invention claimed is:

1. An automatic wood sorting facility comprising,
a cross conveyor comprising multiple parallel conveyor chains and provided with drivers defining a conveying plane on which elongated sawn pieces of wood are advanced perpendicular to their longitudinal axis along the length of the conveying plane,
an inspection zone comprising at least one camera,
a camera-carrying arrangement by which the camera is borne and arranged in such a manner that each piece of wood, which is advanced on the cross conveyor can be inspected by means of the camera,
a robot gripper zone comprising a robot equipped with a robot gripper tool by which a piece of wood can be gripped and handled within a working area for the robot,
a robot-carrying arrangement by which the robot is borne and arranged in such a manner that said conveying plane extends under the working area of the robot with the robot gripper tool,
a robot control unit to which the camera is connected, and which robot control unit further comprises a vision system by which an inspected piece of wood can be identified as a target object, an image processing unit and a robot control configured to form a tracking system with a defined tracking area of the length of the conveying plane,
wherein the robot is configured, with instruction from the vision system, to grip and handle an identified piece of wood within the tracking area,
wherein the robot is configured to lift the elongated pieces of wood from a non-continuous surface of the conveyor chains to a height that clears the drivers provided on the cross conveyor during the gripping and handling operation.

2. The automatic wood sorting facility according to claim 1, comprising a removal arrangement configured to receive a piece of wood gripped and handled by the robot, or a tailgate included in the cross conveyor and configured to receive a piece of wood gripped and handled by the robot.

3. The automatic wood sorting facility according to claim 2, wherein the removal arrangement is arranged to extend transversely in the travelling direction of the cross conveyor.

4. The automatic wood sorting facility according to claim 3, wherein the removal arrangement includes an endlessly travelling conveyor by which pieces of wood taken away are conveyed in their longitudinal direction.

5. The automatic wood sorting facility according to claim 1, wherein the robot-carrying arrangement comprises a frame, which is situated above the conveying plane and extending across the same, and on which frame the robot is mounted straight above the conveying plane of the cross conveyor.

6. The automatic wood sorting facility according to claim 1, comprising means for adjusting the speed of the cross conveyor.

7. The automatic wood sorting facility according to claim 1, comprising the robot gripper tool carried in a tool attachment at an arm end of each robot, which the robot gripper tool is configured to grip and handle a piece of wood.

8. The automatic wood sorting facility according to claim 1, wherein the robot gripper tool comprises a frame carrying an attachment for releasable mounting in the tool attachment of the robot, a first gripper configured to grip and handle a piece of wood through the impact of a plurality of rotatable screw means, which can be screwed into the piece of wood, a second gripper configured to grip and handle a piece of wood through the impact of a parallel gripper with two mutually moveable fingers.

9. The automatic wood sorting facility according to claim 8, wherein the robot gripper tool comprises a first displacement means with which the frame of the robot gripper tool overall and thereby also said first gripper and second gripper, respectively, jointly can be displaced in a direction of motion to respectively from a defined zero point reference in a tool center of the robot.

10. A high-capacity sorting line for elongated sawn wood pieces, comprising
a cross conveyor comprising multiple parallel conveyor chains and provided with drivers defining a conveying plane on which the elongated sawn pieces of wood are advanced perpendicular to their longitudinal axis along the length of the conveying plane,
a plurality of robots that are sequentially mutually spaced downstream along the cross conveyor, and wherein each robot has a defined tracking area,
a removal arrangement provided for each robot,
a work distribution system that monitors a number of identified pieces of wood and their positions in respective downstream tracking areas, and by which a request for gripping and handling an identified piece of wood is carried out with a load-balancing distribution check between the robots depending on the relative downstream state of the piece of wood on the cross conveyor to maximize system throughput,
wherein the robot is configured to lift the elongated pieces of wood from a non-continuous surface of the conveyor chains to a height that clears the drivers provided on the cross conveyor during the gripping and handling operation.

* * * * *